(12) United States Patent
Menke et al.

(10) Patent No.: US 9,381,804 B2
(45) Date of Patent: Jul. 5, 2016

(54) PRESSURE TANK SYSTEM FOR A MOTOR VEHICLE

(75) Inventors: Andreas Menke, Tiefenbronn-Lehningen (DE); Josef Oesterle, Muehlacker (DE); Dirk Braunwarth, Ostfildern (DE)

(73) Assignee: Dr. Ing. h.c.f. Porsche Aktiengesellschaft, Stuttgart (DE)

( * ) Notice: Subject to any disclaimer, the term of this patent is extended or adjusted under 35 U.S.C. 154(b) by 688 days.

(21) Appl. No.: 13/328,168

(22) Filed: Dec. 16, 2011

(65) Prior Publication Data

US 2012/0152370 A1 Jun. 21, 2012

(30) Foreign Application Priority Data

Dec. 21, 2010 (DE) .......................... 10 2010 061 430

(51) Int. Cl.
| | | |
|---|---|---|
| F16L 3/00 | (2006.01) | |
| B65B 1/30 | (2006.01) | |
| B65B 3/26 | (2006.01) | |
| B65B 31/00 | (2006.01) | |
| F02M 33/02 | (2006.01) | |
| B65D 1/42 | (2006.01) | |
| B65D 6/34 | (2006.01) | |
| B65D 8/08 | (2006.01) | |
| B60P 3/00 | (2006.01) | |
| B62D 33/00 | (2006.01) | |
| B65D 88/12 | (2006.01) | |
| B60K 15/03 | (2006.01) | |
| F02M 25/08 | (2006.01) | |
| B60K 15/035 | (2006.01) | |

(52) U.S. Cl.
CPC ............ B60K 15/03 (2013.01); F02M 25/0818 (2013.01); B60K 15/035 (2013.01); B60K 15/03519 (2013.01); B60K 2015/03026 (2013.01); Y10T 137/0396 (2015.04); Y10T 137/7837 (2015.04)

(58) Field of Classification Search
CPC ..................... B60K 15/03; B60K 2015/03026; B60K 15/035; B60K 15/03519
USPC .................. 220/86.2, 562, 646–650; 123/519; 141/83, 94, 95
See application file for complete search history.

(56) References Cited

U.S. PATENT DOCUMENTS

| | | | |
|---|---|---|---|
| 5,317,909 A | | 6/1994 | Yamada et al. |
| 5,380,042 A | * | 1/1995 | Hively et al. .................. 280/834 |
| 5,746,185 A | * | 5/1998 | Kidokoro et al. ............. 123/516 |
| 6,708,724 B2 | * | 3/2004 | Morinaga ...................... 137/588 |
| 6,866,056 B1 | * | 3/2005 | Scott ........................... 137/15.18 |

(Continued)

FOREIGN PATENT DOCUMENTS

| | | |
|---|---|---|
| DE | 10 2008 062 243 | 6/2010 |
| DE | 102009009901 | 8/2010 |
| EP | 2199138 A2 | 10/2009 |
| JP | 2008-008238 | 1/2008 |
| JP | 2009107424 | 5/2009 |

*Primary Examiner* — John K Fristoe, Jr.
*Assistant Examiner* — Kelsey Rohman
(74) *Attorney, Agent, or Firm* — Gerald E. Hespos; Michael J. Porco; Matthew T. Hespos

(57) ABSTRACT

A pressure tank system for a motor vehicle has a fuel tank (4) operated in a differential pressure range between a low pressure and a high pressure. To ensure a simple construction and can be produced cost-effective construction, the low pressure is between ambient pressure minus 50 hectopascals ambient pressure and plus 50 hectopascals.

9 Claims, 2 Drawing Sheets

(56) References Cited

U.S. PATENT DOCUMENTS

| | | |
|---|---|---|
| 6,990,963 B2 | 1/2006 | Hara et al. |
| 7,980,229 B2 | 7/2011 | Menke |
| 2007/0246929 A1 | 10/2007 | Isayama et al. |
| 2009/0250122 A1 | 10/2009 | Menke |
| 2010/0072202 A1* | 3/2010 | Demmer .................. 220/212 |
| 2010/0094493 A1* | 4/2010 | Atsumi ..................... 701/22 |
| 2010/0147847 A1 | 6/2010 | Gebert |

* cited by examiner

PRESSURE TANK SYSTEM FOR A MOTOR VEHICLE

CROSS-REFERENCE TO RELATED APPLICATION

This application claims priority under 35 USC 119 to German Patent Application No. 10 2010 061 430.0, filed on Dec. 21, 2010, the entire disclosure of which is incorporated herein by reference.

BACKGROUND OF THE INVENTION

1. Field of the Invention

The invention relates to a pressure tank system for a motor vehicle, with a fuel tank that is operated in a differential pressure range between a negative pressure and a positive pressure. The invention also relates to a method for operating a pressure tank system of this type and to a motor vehicle with a supporting structure and a pressure tank system of this type.

2. Description of the Related Art

DE 10 2008 062 243 A1 discloses a method for operational venting control on a plastics fuel tank. The method maintains the volume of the fuel tank within a predetermined differential pressure range relative to the ambient pressure by at least one operational venting valve that has a pressure maintaining function.

It is an object of the invention to provide a simple cost effective pressure tank system for a motor vehicle, with a fuel tank that is operated in a differential pressure range between a negative pressure and a positive pressure.

SUMMARY OF THE INVENTION

The invention relates to a pressure tank system for a motor vehicle, with a fuel tank that is operated in a differential pressure range between a low pressure and a high pressure. The low pressure is limited to ambient pressure plus/minus 50 hectopascals. Limiting the negative pressure enables the advantageous elimination of the internal stiffeners that are required in conventional pressure tanks, thereby considerably simplifying the production of fuel tanks.

The fuel tank may be equipped with a negative pressure limiting valve that limits the negative pressure in the fuel tank to the specified value. Thus, ambient air can flow into the fuel tank via the separate negative pressure limiting valve to prevent a greater negative pressure from occurring.

The fuel tank may be equipped with a negative pressure protection valve device that prevents a negative pressure from occurring in the fuel tank. In this case, the negative pressure protection valve device is designed so that only positive pressure or ambient pressure occurs in the fuel tank during the operation of the pressure tank system.

The pressure tank system may be characterized in that the pressure tank system comprises a conventional fuel tank made of plastic or sheet steel, thereby considerably reducing the production costs for the pressure tank system.

The fuel tank preferably is surrounded, at least partially, by an outer reinforcing structure. Thus, the fuel tank is reinforced only with an outer reinforcing structure and does not include any inner reinforcing structure.

The fuel tank preferably has a regenerating filter device. The regenerating filter device preferably contains an activated carbon filter material with which hydrocarbons from fuel vapors in the fuel tank can be bound.

The pressure tank system preferably has a tank shutoff valve connected between the fuel tank and the regenerating filter device. The fuel tank is connected to the regenerating filter device via the tank shutoff valve as required.

The invention also relates to a method for operating the above-described pressure tank system so that the negative pressure in the fuel tank is limited to ambient pressure plus/minus 50 hectopascals. More particularly, the pressure tank system is operated so that only positive pressure or ambient pressure, and possibly a slight negative pressure, is applied to the fuel tank during operation.

The invention further relates to a motor vehicle with a supporting structure and the above-described pressure tank system that preferably is operated in accordance with the above-described method. The supporting structure defines an outer reinforcing structure of the fuel tank. The supporting structure of the fuel tank preferably defines a monocoque body formed, for example, from carbon fibers and aluminum.

The motor vehicle preferably is a hybrid vehicle, in particular a plug-in hybrid vehicle that can be charged at a socket of a power supply system.

Further features of the invention emerge from the description below, in which an exemplary embodiment is described in detail with reference to the drawing.

DETAILED DESCRIPTION OF THE PREFERRED EMBODIMENT

Figure 1:
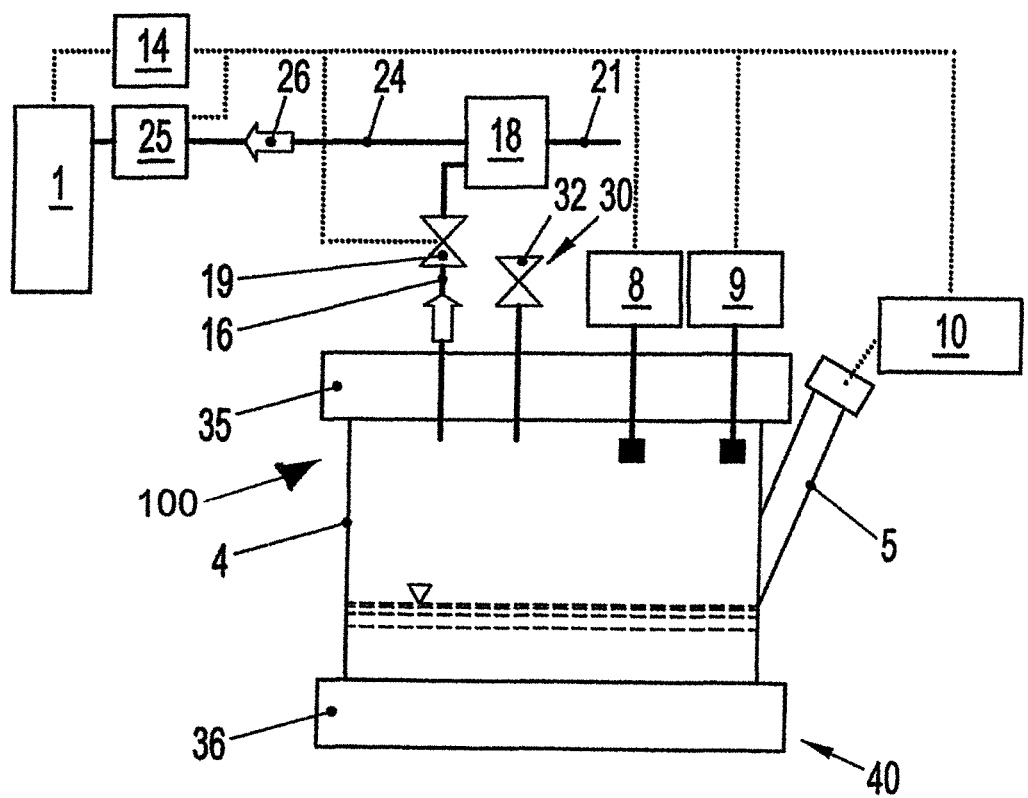
FIG. 1 is a simplified illustration of a pressure tank system according to the invention with an internal combustion engine and a fuel tank.
Figure 2:
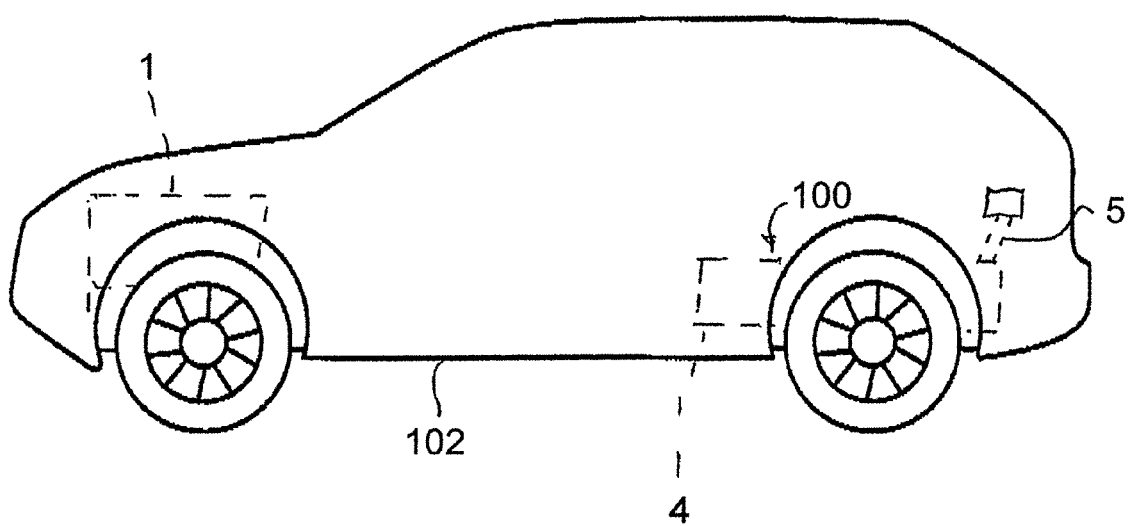
FIG. 2 is a schematic illustration of a motor vehicle that incorporates the pressure tank system of FIG. 1.

FIG. 1 is a greatly simplified representation of a pressure tank system 100 according to the invention with an internal combustion engine 1 and a fuel tank 4. The pressure tank system 100 is used in a motor vehicle 102, such as a hybrid motor vehicle 102 illustrated schematically in FIG. 2. The fuel tank 4 has a filler neck 5 via which fuel is introduced into the fuel tank.

The fuel tank 4 is assigned sensor devices 8, 9 and a tank cap release device 10. The sensor devices 8, 9 detect the pressure and the temperature in the fuel tank 4. The sensor devices 8, 9 are connected to a control device 14 via signal lines.

The filler neck 5 can be closed by a tank cap that can be locked or released with the aid of the tank cap release device 10. The tank cap release device 10 is connected in terms of control to the control device 14 via a control line. The tank cap preferably is released by the tank cap release device 10 only when ambient pressure prevails in the interior of the fuel tank 4.

The fuel tank 4 is connected to a regenerating filter device 18 via a venting line 16. The filter device 18 comprises activated carbon filter material that functions to absorb and bind hydrocarbons from fuel vapors in the fuel tank. A tank shutoff valve 19 is connected into the venting line 16 between the fuel tank 4 and the filter device 18.

The filter device 18 can be connected to the surroundings via a line 21 to conduct ambient air through the filter device 18 for flushing the filter device 18. The filter device 18 can be connected to the internal combustion engine 1 via a connecting line 24 for flushing. A tank venting valve 25 is arranged in the connecting line 24. A flushing flow from the filter device 18 via the open tank venting valve 25 to the internal combustion engine 1 is indicated by an arrow 26.

The fuel tank 4 further has a negative pressure protection valve device 30. The negative pressure protection valve device 30 comprises, for example, a negative pressure limiting valve 32 and functions to limit the operating pressure in the interior of the fuel tank 4 to no negative pressure at all or to a very slight negative pressure of, for example, 50 hectopascals.

The negative pressure protection valve device 30 of the invention limits the operating pressure parameters of the fuel tank 4 during operation of the pressure tank system so that negative pressure is prevented from occurring in the fuel tank 4 and only a positive pressure or ambient pressure is permitted in the interior of the fuel tank 4.

Limiting the operating pressure parameters of the pressure tank system enables use conventional standard tanks made of sheet metal or of plastic produced, for example, by blow molding.

No reinforcements or stiffening means are required in the interior of the fuel tank 4. Thus, standard production methods can be used to produce the fuel tank 4 and the costs for producing the fuel tank can be reduced considerably.

The fuel tank 4 illustrated in FIG. 1 is provided only with outer supports 35, 36. The outer supports 35, 36 constitute an outer reinforcing structure 40 to ensure that the fuel tank 4 withstands the positive pressure of, for example, 300 to 800 hectopascals, in particular 400 to 500 hectopascals, that occurs during the operation of the pressure tank system.

The outer reinforcing structure 40 may comprise, for example, a steel framework and/or a carbon fiber structure. The outer reinforcing structure can be provided particularly advantageously by a monocoque motor vehicle body. The use of the monocoque motor vehicle body as an outer reinforcing structure 40 affords the advantage that no additional reinforcements are required.

What is claimed is:

1. A pressure tank system for a motor vehicle that has an internal combustion engine, the pressure tank system comprising:
   a fuel tank at least partly surrounded by an outer reinforcing structure and having an interior with no internal reinforcements or stiffeners;
   a filler neck extending into communication with the interior of the fuel tank;
   a tank cap releasably engaged on the filler neck and having a tank cap release device for selectively locking the tank cap on the filler neck;
   a pressure sensor for sensing pressure in an upper region of the fuel tank at a location spaced from the filler neck;
   a venting line extending from the upper region of the fuel tank and communicating with an upper surface of fuel in the fuel tank at a location spaced from the filler neck;
   a regenerating filter device connected to the venting line and operative to absorb or bind hydrocarbons from fuel vapors from the fuel in the fuel tank;
   a tank shut-off valve in the venting line between the fuel tank and the regenerating filter device;
   a connecting line extending from the filter device to the internal combustion engine;
   a tank venting valve in the connecting line;
   a negative pressure limiting valve providing direct communication between surroundings of the motor vehicle and the upper region of an interior of the fuel tank at a location that is spaced from the venting line and from the filler neck, the negative pressure limiting valve being in direct communication with the upper surface of the fuel in the fuel tank, the negative pressure limiting valve being operative to open when a pressure in the fuel tank is between ambient pressure and minus 50 hectopascals for increasing pressure in the fuel tank substantially to ambient pressure; and
   a control device controlling operation of the tank shut-off valve and the tank venting valve for selectively permitting absorption of hydrocarbon vapors from the fuel tank into the regenerating filter device and for selective purging the hydrocarbon vapors from the regenerating filter device to the internal combustion engine, wherein the control device further causes the tank cap release device to release the tank cap only when the pressure in the fuel tank is substantially equal to ambient pressure.

2. The pressure tank system of claim 1, wherein the fuel tank is made of plastic or sheet metal.

3. The pressure tank system of claim 1, wherein the outer reinforcing structure comprises at least one of a steel framework and a carbon fiber structure.

4. The pressure tank system of claim 1, further comprising a line extending from the surroundings of the motor vehicle and the filter device for selectively flushing the hydrocarbons from the filter device to the internal combustion engine.

5. A motor vehicle, comprising:
   a pressure tank system with a fuel tank that has an outer reinforcing structure at least partially surrounding the fuel tank and no internal reinforcements or stiffeners, a filler neck extending into communication with the interior of the fuel tank, a tank cap releasably engaged on the filler neck, a tank cap release device for selectively locking the tank cap on the filler neck, a pressure sensor for sensing pressure in an upper region of the fuel tank at a location spaced from the filler neck, a venting line extending from an upper region of the fuel tank and communicating with an upper surface of fuel in the fuel tank, a regenerating filter device connected to the venting line and operative to absorb or bind hydrocarbons from fuel vapors of the fuel in the fuel tank, a tank shut-off valve in the venting line between the fuel tank and the regenerating filter device, a connecting line extending from the filter device to the internal combustion engine, a tank venting valve in the connecting line, and a negative pressure protection valve device for selectively providing direct communication between ambient surroundings and the upper region of an interior of the fuel tank at a location that is spaced from the venting line and from the filler neck and that is in direct communication with the upper surface of the fuel in the fuel tank, the negative pressure limiting valve being operated in a differential pressure range between ambient pressure and ambient pressure minus 50 hectopascals for limiting negative pressure to minus 50 hectopascals; and
   a control device controlling operation of the tank shut-off valve and the tank venting valve for selectively permitting absorption of hydrocarbon vapors from the fuel tank into the regenerating filter device and for selective purging the hydrocarbon vapors from the regenerating filter device to the internal combustion engine, wherein the control device further causes the tank cap release device to release the tank cap only when the pressure in the fuel tank, as measured by the pressure sensor for sensing pressure in an upper region of the fuel tank, is substantially equal to ambient.

6. The motor vehicle of claim 5, wherein the motor vehicle is a hybrid vehicle.

7. The motor vehicle of claim 5, wherein the fuel tank is made of plastic or sheet metal.

8. The motor vehicle of claim 5, wherein the outer reinforcing structure comprises at least one of a steel framework and a carbon fiber structure.

9. The motor vehicle of claim 8, wherein the outer reinforcing structure is configured to permit a maximum pressure in the fuel tank in a range of 300 to 800 hectopascals.

* * * * *